(12) United States Patent
Kato

(10) Patent No.: US 8,451,507 B2
(45) Date of Patent: May 28, 2013

(54) IMAGE-READING APPARATUS AND IMAGE-FORMING APPARATUS

(75) Inventor: Masaki Kato, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 295 days.

(21) Appl. No.: 13/029,881

(22) Filed: Feb. 17, 2011

(65) Prior Publication Data

US 2011/0205598 A1 Aug. 25, 2011

(30) Foreign Application Priority Data

Feb. 25, 2010 (JP) ................................. 2010-040140

(51) Int. Cl.
- *G06T 5/00* (2006.01)
- *H04N 1/40* (2006.01)
- *H04N 1/04* (2006.01)
- *G06K 9/40* (2006.01)

(52) U.S. Cl.
USPC ........... 358/3.26; 358/474; 358/448; 382/274

(58) Field of Classification Search
USPC ........... 358/3.26, 474, 448; 382/274; 250/580
See application file for complete search history.

(56) References Cited

U.S. PATENT DOCUMENTS

| | | | | |
|---|---|---|---|---|
| 6,330,083 B1 * | 12/2001 | Nabeshima et al. | ........... | 358/474 |
| 2003/0226984 A1 * | 12/2003 | Iwakiri | ........................ | 250/580 |

FOREIGN PATENT DOCUMENTS

| | | | |
|---|---|---|---|
| JP | 10-257249 | A | 9/1998 |
| JP | 11-46289 | A | 2/1999 |
| JP | 2007-208939 | A | 8/2007 |
| JP | 2008-244900 | A | 10/2008 |
| JP | 2008-252224 | A | 10/2008 |

OTHER PUBLICATIONS

Notice of Reasons for Rejection issued to Japanese Application No. 2010-040140, mailed Apr. 24, 2012.

* cited by examiner

*Primary Examiner* — Charlotte M Baker

(57) ABSTRACT

An image-reading apparatus includes a gain correction processing portion, and a gain setting control portion including a setting portion that sets a gain condition, the gain setting control portion: repeatedly sets the gain condition in the setting portion at predetermined time intervals, and records the set gain condition in the recording portion, in an idling state from when the power supply portion switches to an on state until a reception portion receives a read instruction; stops setting the gain condition in the setting portion in a reading state after the reception portion receives the read instruction; and implements gain correction on electrical signals output from an imaging element in the gain correction processing portion by applying the gain condition recorded in the recording portion just before the reception portion receives the read instruction.

6 Claims, 4 Drawing Sheets

IMAGE-READING APPARATUS AND IMAGE-FORMING APPARATUS

This application is based on and claims the benefit of priority from Japanese Patent Application No. 2010-040140, filed on 25 Feb. 2010, the content of which is incorporated herein by reference.

BACKGROUND OF THE INVENTION

1. Field of the Invention

The present invention relates to an image-reading apparatus including a gain correction processing portion, and an image-forming apparatus equipped with the image-reading apparatus.

2. Related Art

An image-reading apparatus, for example, is configured to include a light source that radiates light onto an original, and electrical components (imaging elements) that change electrical signals by measuring light reflected from the original, and a variety of other components. The shapes and properties of the variety of other components may vary because sizes may not be appropriate or because of changes that can occur over time. In such a case, variations can develop in image data and the like that are obtained by an image-reading apparatus.

Normally, variations that develop in the image data can be resolved by implementing a correction process that uses software. Image-reading apparatuses are able to provide good quality images by implementing such a correction process. Gain correction that corrects variations in quantity of light in light source components, and shading correction that corrects variations in a quantity of light in one line in a main-scanning direction for reading data are representative correction processes. Gain correction includes the concept of gain adjustment. However, the explanation below will use the term gain correction.

Normally, correction processes includes the processes of comparing a status of the apparatus when implementing a reading operation and a predetermined standard state, calculating correction conditions to compensate for differences, and referencing correction conditions. However, some correction processes take time. Also, some corrections may not always correspond to reading operations.

For example, the shading correction process mentioned above implements a correction process in a short amount of time. For that reason, even if a predetermined measurement is taken and a correction condition is calculated just before (after an image read instruction is input) reading an image, a user is made to wait a short amount of time. For that reason, the user does not feel any unpleasantness toward the image-reading process.

However, depending on the algorithm that implements the correction process, gain correction processes can sometimes take several hundreds of ms. In other words, if the apparatus starts taking predetermined measurements and calculating correction conditions after the user presses a button to start reading (start scanning) (to start reading), the user must wait a long time for the gain correction process to complete to start the reading operation. For that reason, users sometimes experience unpleasantness toward the time lag in the image-reading process.

If time-consuming gain correction processes are started just before the reading process, users will feel irritated or unpleasant.

In contrast, when the apparatus power is switched on, gain correction condition (gain setting values) settings applied by the amplifier (amplifier 15 in AFE14) that amplifies electrical signals output from a color CCD sensor 13 (imaging elements), are implemented for a B/W and a color mode, in that order, and gain setting values are saved in a memory portion 30. Also, this image-reading apparatus is configured to implement a gain correction process by applying gain setting values recorded in the memory portion 30, on electrical signals obtained in a reading process on the image-reading apparatus.

As shown in FIG. 1, output from the imaging elements is at a maximum when the power is switched on, and gradually tapers off thereafter.

Therefore, if gain correction conditions are set when the power is switched on, that gain adjustment condition will deviate from gain condition that should be applied when a reading process is implemented, as with the image-reading apparatus described above. The image-reading apparatus described above applies a correction process on electrical signals that are output from the imaging elements as a gain correction condition that is not in line with the true gain correction conditions.

The result is that an inadequate gain correction effect is sometimes obtained. Also, sometimes there are anomalies in the output images. For example, images that are different from the original are sometimes produced. These kinds of undesirable situations can sometimes occur.

SUMMARY OF THE INVENTION

Therefore, the present invention was conceived in view of the issues described above. An object of the present invention is to provide an image-reading apparatus that maintains precision of a gain correction process and has fewer process delays caused by gain correction processes.

Also, another object of the present invention is to provide an image-forming apparatus equipped with the aforementioned image-reading apparatus.

The present invention is an image-reading apparatus including:

a power supply portion;

a reception portion that receives a read instruction;

a light source for radiating light onto a white balance reference card or an original;

an imaging element that detects light reflected from the white balance reference card or the original and converts the reflected light thus detected into electrical signals;

a gain correction processing portion that implements a gain correction process, based on predetermined gain conditions, on electrical signals output from the imaging element;

a recording portion that records a gain condition applied by the gain correction processing portion; and a gain setting control portion including a setting portion that sets the gain condition based on the electrical signals the imaging element converted by detecting light reflected from the white balance reference card or the original, in which the gain setting control portion:

repeatedly sets a setting portion at predetermined time intervals and records the set gain conditions in the recording portion, in an idling state after the power supply portion switches to an on state until the reception portion receives a reading instruction;

stops setting the gain conditions in the setting portion in a reading state after the reception portion receives the read instruction; and implements gain correction on electrical signals output from the imaging element in the gain correction processing portion by applying the gain conditions recorded in the recording portion, just before the reception portion receives the read instruction.

Also, the present invention provides an image-forming apparatus equipped with the image-reading apparatus.

The present invention provides an image-reading apparatus that maintains precision of a gain correction process and has fewer processing delays caused by a gain correction process. Also, the present invention provides an image-forming apparatus equipped with the image-reading apparatus.

DETAILED DESCRIPTION OF THE INVENTION

The following will now explain a preferred embodiment of the present invention with reference to the drawings provided. The embodiment described below is one example embodiment of the present invention; it is not intended to be a limitation of a technical scope of the present invention.

The following will now explain a general scope of the image-forming apparatus according to an embodiment of the present invention.

Figure 4:
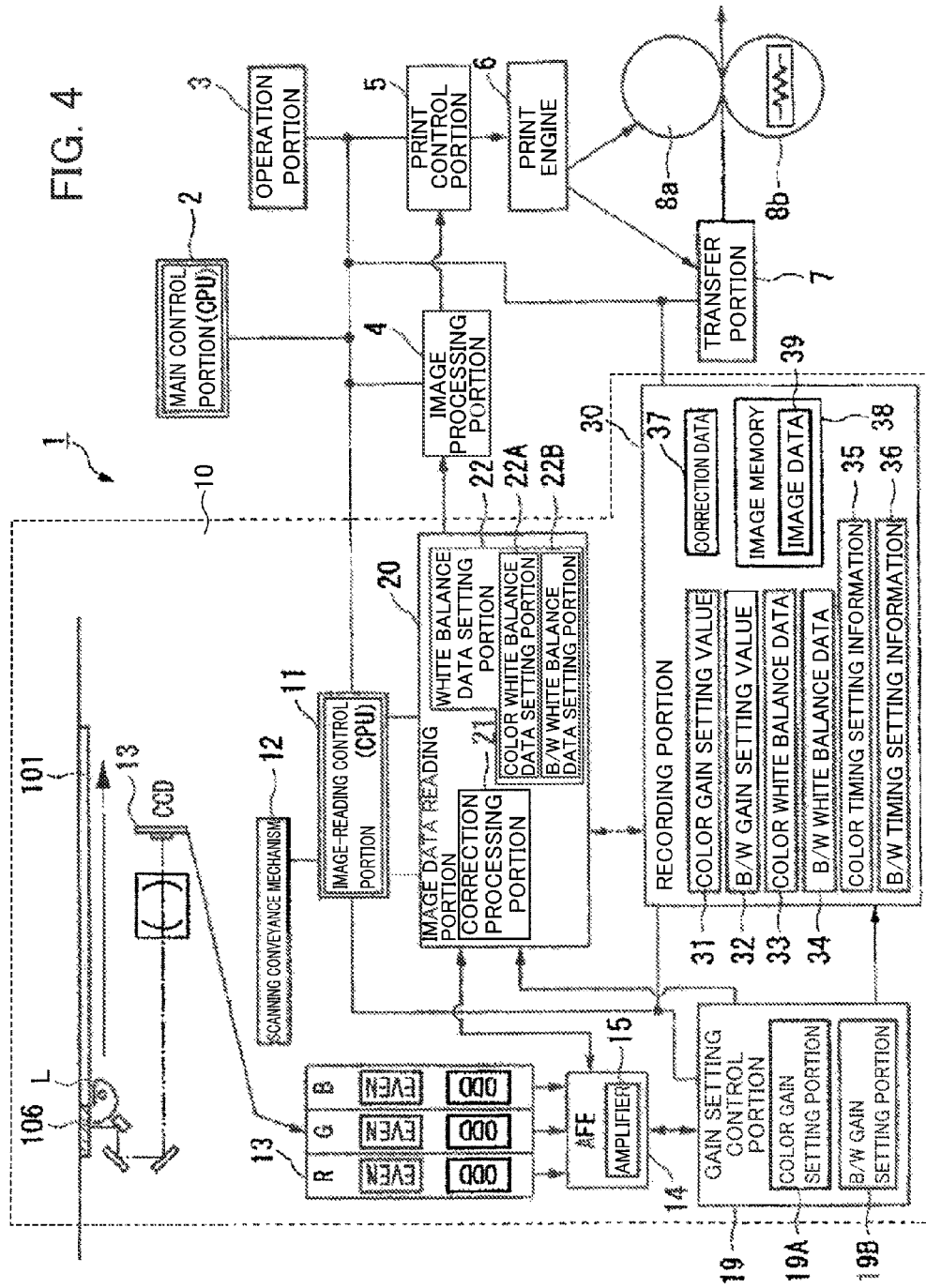
FIG. 4 is a block diagram showing a control system of an embodiment of the image-forming apparatus of the present invention.

FIG. 4 is a block diagram showing a configuration of the image-forming apparatus according to the present invention.

In the image-forming apparatus 1 shown in FIG. 4, the main control portion 2 is a control portion including a CPU and the like. The main control portion 2 is a processing portion that controls overall operations of each portion in the image-forming apparatus 1.

The operation portion 3 is a control panel that has a display portion such as an LCD panel and operation keys, and the like. The operation portion 3 is a user-input portion for inputting instructions to operate the image-forming apparatus 1.

Image processing portion 4 is a processing portion for converting original image data read by an image-reading portion 10 into image data used for printing that corresponds to a printer (for example image data that corresponds to each toner color used). The image-processing portion 4 also implements processes for editing an image (such as changing resolution, enlarging/reducing, or rotating, and the like).

Print control portion 5 is a control portion for printing onto paper print image data generated by the image-processing portion 4. This print control portion 5 controls a transfer portion 7 that transfers toner to paper and a print engine 6 that includes a mechanism (for example a pressure roller 8a and a fuser roller 8b) for conveying printing paper. The print control portion 5 runs printing operations on the print engine 6 and the transfer portion 7.

An image-reading portion (image-reading apparatus) 10 is a portion that composes a scanner that reads an original.

As shown in FIG. 4, the image-reading portion (image-reading apparatus) 10 has an image-reading control portion 11 (reception portion), a light source L, a color CCD sensor 13 (imaging elements), an AFE 14 that includes an amplifier 15 (gain correction processing portion), a recording portion 30, and a gain setting portion control portion 19. The image-reading portion (image-reading apparatus) 10 also has a scanning conveyance mechanism 12, and an image data reading portion 20 that includes a correction processing portion 21, and a white balance data setting portion 22. Also, the image-reading portion (image-reading apparatus) 10 implements a predetermined operation using electric power supplied from the power supply portion when the power supply portion, not shown, switches to an on state. The image-reading portion (image-reading apparatus) 10 starts up and enters an idling state when electric power is supplied from the power supply. When the image-reading control portion 11 receives a read instruction in the idling state, the image-reading portion (image-reading apparatus) 10 switches to a reading state and starts a predetermined reading operation.

The image-reading control portion 11 in the image-reading portion 10 is a control portion that includes a CPU and the like. The image-reading control portion 11 is a processing portion that controls overall operations of each portion in the image-reading apparatus 10.

When the image-reading control portion 11 receives a read instruction (start-scanning instruction) output from the operation portion 3, it outputs predetermined instructions to the scanning conveyance mechanism 12, the color CCD sensor 13, the gain setting control portion 19, and the like.

If the image-forming apparatus is a copier, the read instruction (start-scanning instruction) is input to the image-reading control portion 11 by pressing a Copy button; if it is a facsimile, the instruction is input by receiving a facsimile signal.

The scanning conveyance mechanism 12 is a processing portion that controls an original reading mechanism (for example, an original conveyance mechanism or a mirror moving mechanism, and the like).

The light source L moves along contact glass 101. The light source L radiates light onto an original or a white balance reference card 106.

The color CCD sensor 13 (imaging elements, optical components) detects light reflected from an original or the white balance reference card 106 and converts that into electrical signals. The color CCD sensor 13 (imaging elements, optical components) receives light reflected from the original or the white balance reference card 106, detects the received reflected light and converts the reflected light thus detected into electrical signals.

The color CCD sensor 13 is a CCD image sensor for reading an original, and is composed of 3 line sensors for reading the colors of R (red), G (green) and B (blue). Also, the R, G, B-color line sensors are composed of two line sensors that read odd lines (odd) and even lines (even).

The AFE (analog front end) 14 is a 3-channel type analog front end. AFE 14 amplifies electrical signals (image signals) output from the color CCD sensor 13 (imaging elements), corrects odd/even, corrects offset, output digital image data by converting analog to digital (A/D) data. AFE 14 has the amplifier 15.

The amplifier (gain correction processing portion) corrects gain by applying a predetermined gain setting value (gain condition) on electrical signals output from the color CCD sensor 13. The gain setting value (gain condition) applied by gain correction processing in the amplifier 15 is set using a setting portion included in the gain setting control portion 19, described below.

The gain setting control portion 19 includes setting portions. The setting portions set gain setting values applied by the amplifier 15 in the AFE 14, based on electrical signals that are converted by the color CCD sensor 13 measuring light reflected from the white balance reference card 106. The setting portions set gain setting values for the amplifier 15 in the AFE 14, based on electrical signals that are output by the color CCD sensor 13 reading the white balance reference card 106.

The gain setting control portion 19 includes as setting portions a color gain setting portion 19A and a B/W gain setting portion 19B.

The gain setting control portion 19 repeatedly sets the gain setting value in the setting portion at predetermined time intervals in an idling state from when the power supply portion switches to an on state until the image-reading control portion 11 (reception portion) receives a start-scanning instruction.

The gain setting control portion 19 repeatedly implements AGC (automatic setting control of the gain setting value applied by the amplifier 15) in the AFE 14 for both the color and B/W modes at predetermined time intervals while the apparatus is in an idling state, after the image-forming apparatus 1 power is switched on (the power supply portion switches to an on state).

Also, the gain setting control portion 19 records the set gain setting value in the recording portion 30. Specifically, the gain setting control portion 19 records in the recording portion 30 composed of an SRAM (Static Random Access Memory) and the like the color gain setting values (color mode gain setting values (gain conditions)) and the B/W gain setting values (B/W mode gain setting values (gain conditions)) obtained at that time.

The gain setting value setting procedures will now be explained in further detail with reference to FIG. 2.

Also, the gain setting control portion 19 stops setting gain setting values in the setting portion when the image-reading control portion 11 (reception portion) receives a start-scanning instruction (a read instruction) (when the status changes to a reading status).

Also, the gain setting control portion 19 causes the amplifier 15 (gain correction processing portion) to perform gain correction processing by applying the gain setting value recorded in the recording portion 30 just before the image-reading control portion 11 (reception portion) received the start-scanning instruction (read instruction), on electrical signals output from the color CCD sensor 13 (imaging elements) after the start-scanning instruction (read instruction) is received.

When using AGC to set color mode and B/W mode gain setting values with the gain setting control portion 19, the user simultaneously sets the control timing for AFE 14 that matches the mode. The user simultaneously sets the timing of the sync signals and data reading signals for the AFE 14. The gain setting control portion 19 records these timing setting data in the recording portion 30 as the color timing setting data and B/W timing setting data.

Here, time intervals for repeatedly setting gain setting values in the setting portion are set to desired time intervals.

The gain setting portion control portion 19 can be set for longer time intervals for the setting portions to repeatedly set gain setting values as the length of time that passes after the power supply portion switches to an on state becomes longer. Here, not only can the gain setting control portion 19 continuously lengthen the time intervals as the passage of time lengthens, but it can also be set longer in stages.

The image data reading portion 20 includes a correction processing portion 21 and a white balance data setting portion 22.

The image data reading portion 20 extracts image data within a range of the original from the image data (electrical signals) output from the AFE 14 and adjusts the image using the correction processing portion 21.

The correction processing portion 21 implements an optical system MTF (Modulation Transfer Function) correction process or a shading correction process based on white balance data for original image data output from the AFE 14. Shading correction substantially corrects sensitivity variations generated between photoelectric conversion elements that are caused by characteristic variations of the photoelectric conversion elements in the color CCD sensor 13 or variations in the quantity of light from the light source. However, a detailed explanation of this kind of correction will be omitted because it is not directly relevant to the present invention.

Also, the white balance data setting portion 22 includes a color white balance data setting portion 22A and a B/W white balance data setting portion 22B. The white balance data setting portion 22 is a processing portion that obtains white balance data for each of the color and B/W modes based on the image data (electrical signals) of the white balance reference card 106 output from the AFE 14. Color white balance data (color mode white balance data) and B/W white balance data (B/W mode white balance data) obtained in this way are stored in the recording portion 30.

The gain setting values applied by gain correction processing in the amplifier 15 are recorded in the recording portion 30. Data needed for processing in the image-forming apparatus 1 are recorded in the recording portion 30.

Color gain setting value 31 (gain condition), B/W gain setting value (gain condition), color white balance data 33, B/W white balance data 34, color timing setting information 35, B/W timing setting information 36, and correction data (MTF or shading correction data and the like) are saved in the recording portion 30. An image memory 38 is included in the recording portion 30; image data 39 read from an original is saved in this image memory 38.

Gain correction processing in color mode and in B/W mode on the image-forming apparatus 1 configured as described above will now be explained.

When the image-forming apparatus 1 power supply is switched on, in other words, when the power supply portion switches to an on state, the gain setting control portion 19 implements automatic setting controls (AGC) for the B/W mode gain setting value on the amplifier 15 in the AFE 14 with the B/W gain setting portion 19B. Next, the gain setting control portion 19 implements automatic setting controls (AGC) for the color mode gain setting value with the color gain setting portion 19A.

The gain setting control portion 19 records in the recording portion 30, the BW/gain setting value 32 and the color gain setting value 31 obtained at that time. Also, the color timing setting information 35 and B/W timing setting information 36 that are the timings for setting gain setting values with the B/W gain setting portion 19B are stored in the recording portion 30.

Also, the B/W white balance data setting portion 22B records in the recording portion 30 white balance data obtained based on the B/W gain setting value 32 that was determined last, as B/W white balance data 34.

Also, the color white balance data setting portion 22A records in the recording portion 30 white balance data obtained based on the color gain setting value 31 that was determined last, as color white balance data 33.

Also, in B/W mode, when the image-reading control portion 11 receives the start-scanning instruction, the B/W gain setting portion 19B reads from the recording portion 30 the last saved (directly before) B/W gain setting value 32, and sets (applies) the B/W gain setting value 32 as a gain condition for the amplifier 15 in the AFE 14. Also, if required, the white balance data setting portion 22 reads B/W white balance data 34 from the recording portion 30 and sets the B/W white balance data 34 used by the correction processing portion 21.

Also, in color mode, when the image-reading control portion 11 receives the start-scanning instruction, the color gain setting portion 19A reads from the recording portion 30 the last saved (directly before) color gain setting value 31, and sets (applies) the color gain setting value 31 as a gain condition for the amplifier 15 in the AFE 14. Also, if required, the color white balance data setting portion 22A reads color white balance data 33 from the recording portion 30 and sets the color white balance data 33 used by the correction processing portion 21.

The color CCD sensor 13 is a three-line, color CCD image sensor having reading features for the colors of R (red), G (green) and B (blue). CCD sensors of each color are equipped with a two-line (odd and even lines) CCD analog shift register.

Gain setting processing is implemented for one color in B/W mode (for example G), and three colors for color mode). In such a case, there are odd and even lines for CCD sensors of each color, so gain setting processing is implemented over a total of eight channels. Also, gain setting processing is implemented in the order of B/W mode, then color mode (although the reverse is also acceptable).

With this embodiment, the gain setting control portion 19 (image-reading apparatus) repeatedly performs setting processes (sets gain setting values for signals output from the color CCD sensor 13) for color mode and B/W mode gain setting values, and records color gain setting values 31 and B/W gain setting values 32, and color white balance data 33 and B/W white balance data 34 in the recording portion 30, after apparatus power is switched on (power supply portion switches to an on state), as one cycle to execute a gain setting process in an idling state until the start-scanning instruction (image-reading process instruction) is input to the image-reading apparatus 11. If the idling process is long, the gain setting process continues multiple times.

If the image-forming apparatus is a copier, the start-scanning instruction is input by pressing a Copy button; if it is a facsimile, the instruction is input by receiving a facsimile signal.

It is acceptable for the gain setting control portion 19 to set longer time intervals when the color gain setting portion 19A and the B/W gain setting portion 19B repeatedly set a color gain setting value (gain condition) and B/W gain setting value (gain condition) as the passage of time becomes longer after the power supply switches to an on state, in an idling state.

Note that in the idling state (while idling), it is preferable to continue lighting the light source L. It is also acceptable to continue lighting the light source L and to continue to radiate light on the white balance reference card 106. With this embodiment, a gain setting process is repeatedly performed immediately after the image-reading apparatus enters an idling state. For that reason, there is no meaning in extinguishing the light source L each single time the gain setting process ends. Conversely, such a process to extinguish light source L each time actually consumes more power.

The image-reading portion (image-reading apparatus) 10 stops the gain setting process when the start-scanning instruction (image-read instruction) is input to the image-reading control portion 11 while the gain setting process is executing in an idling state, starts the scanning operation and uses the last acquired gain correction value (color gain setting value 31, B/W gain setting value 32, color white balance data 33, and the B/W white balance data 34) to correct the image data from the imaging elements.

Figure 2:
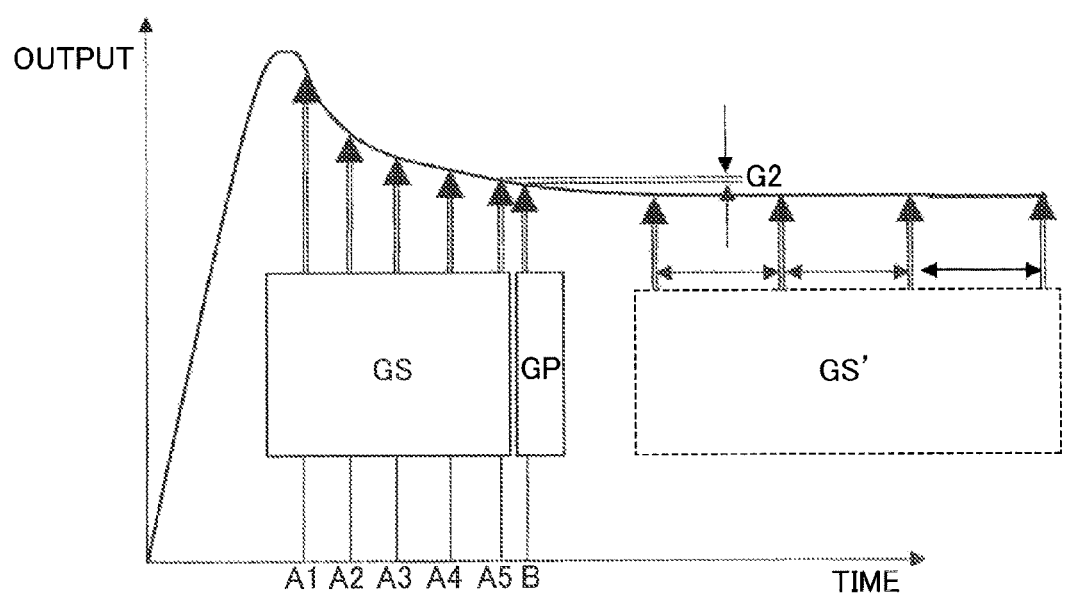
FIG. 2 is a graph showing timing of a gain correction process operation in an image-reading apparatus according to the present invention.

This is shown in FIG. 2.

Figure 3:
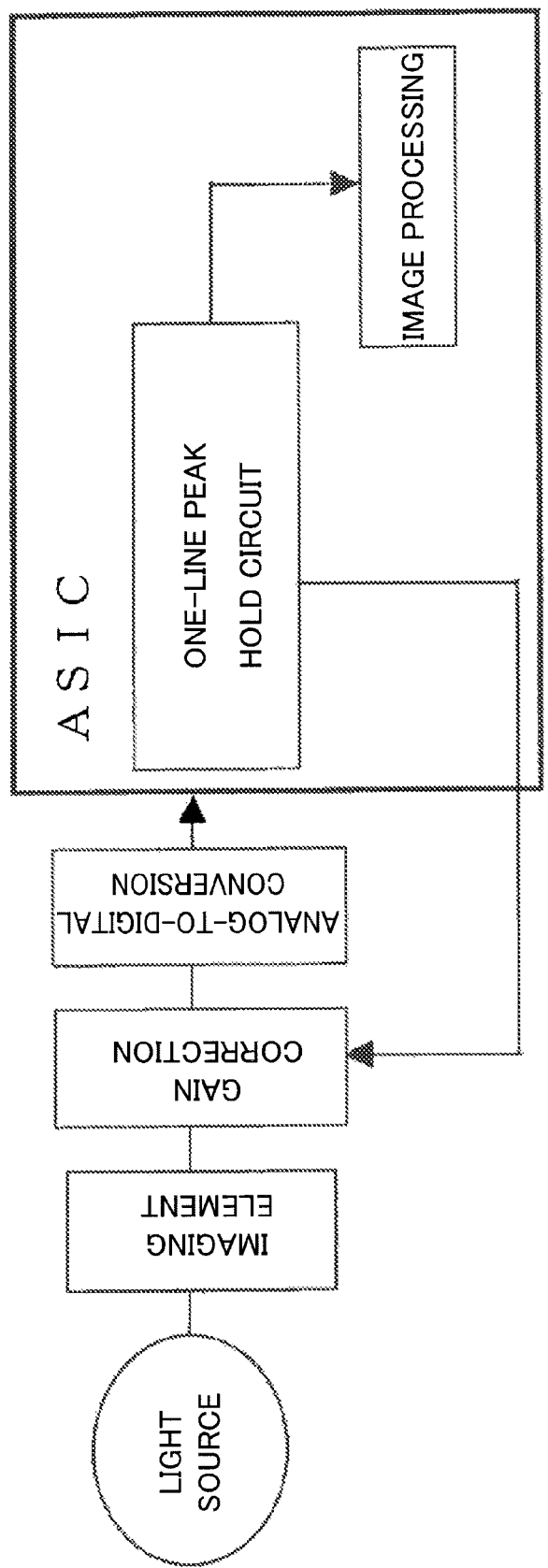
FIG. 3 is a block diagram showing a general image data processing procedure.

The following will now provide a brief overview of the gain correction process in the amplifier 15. FIG. 3 is a block diagram showing an overview of gain correction means in the image-reading apparatus according to the present invention.

As shown in FIG. 3, light reflected from the original, irradiated from the light source L is received by the color CCD sensor 13 (imaging elements). The electrical signals output from the color CCD sensor 13 that received that light are converted analog to digital. After this analog-to-digital conversion (image data), electrical signals (image data) are processed by ASIC (Application Specification Integrated Circuit).

Figure 1:
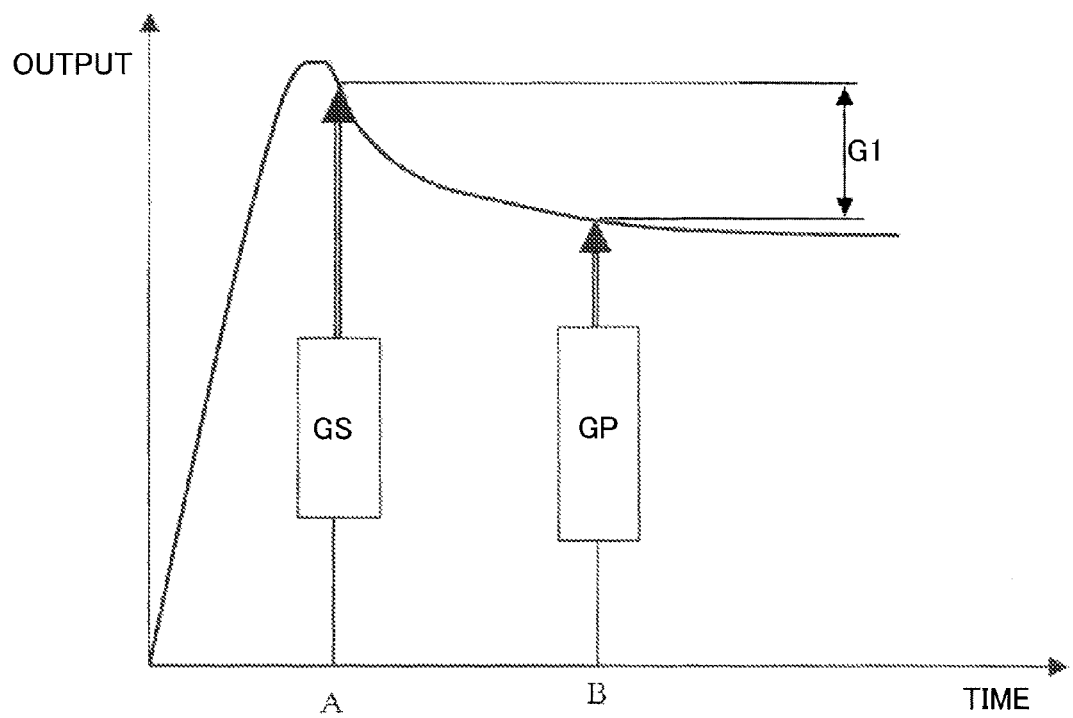
FIG. 1 is a graph showing changes in output from an imaging element in a conventional image-reading apparatus and a timing of a conventional gain correction process operation.

As shown in FIG. 1, a characteristic of imaging elements is that they gradually change over time after power is switched on. For that reason, when electrical signals output from imaging elements that received the light, and converted analog-to-digital are fed to ASIC as is, those overall electrical signals can change dramatically according to imaging-element property variations, even if there is no change in the original. In such a case, the image-reading apparatus does not obtain the same image data for the same original. Specifically, reproducibility is reduced.

The setting portion sets the amplification rate to be applied by the amplifier (amplifier 15 in FIG. 4) that amplifies the electrical signals output from the color CCD sensor 13, so that the image data obtained from the same original is always the same data.

The gain setting value settings are performed by adjusting the amplification rate on electrical signals passed to the ASICs described above, for the light reflected from the white balance reference card 106, so that the peak value is the appropriate value (always the same value) after a peak is detected (maximum value detection or the average value detection) by a one-line peak hold circuit.

If, for example, an appropriate value of a peak value when converted analog-to-digital in 8 bits was 240 of a 256 scale, the gain setting portions 19A and 19B adjust the gain condition (gain setting value) to raise the gain so that the actual peak value is 240, if the sampled peak value was 200, and to lower the gain if the peak value exceeded that value.

Here, as described above, gain correction processing takes several hundred ms, depending on the algorithm that is adopted.

Gain adjustment procedures include the following: (1) an image-data sampling process (period); (2) I-line peak detection process (period); and (3) a feedback process (period).

Also, of these, (1) an image-data sampling process (period) requires the longest processing time.

Reading time for one line is determined according to the apparatus, but that time will increase as the number of sampling lines is increased, as described above. (1 line reading time×number of lines). To consider this using general numbers, if the time for one line is 1 ms, and there are 100 lines, the time required for sampling once will be: 1 ms×100 lines=100 ms. For an algorithm that adjusts gain by performing sampling multiple times, a further multiple of 100 ms time is required. For (2) 1-line peak detection process, the peak value is updated at the same time as data is sampled, so it is possible to detect the peak value with 1 line. The feedback time for (3), depends upon the configuration, but if only gain is being set, several ms is an adequate setting.

For that reason, there is a time-lag mainly for (1) image data sampling period time (several hundred ms) in conventional image-reading apparatuses when the processes described above is implemented from when the start-scanning button is pressed to implement a reading process until the reading operation is started thereafter. It is this time-lag that is unpleasant for users.

With the image-reading apparatus according to this embodiment, time for the (1) image data sampling period is not necessary after the user presses the start-scanning button, so the image-reading apparatus is able to suppress the time-lag.

In this way, according to this embodiment of the present invention, the amplifier 15 corrects image data output from the imaging elements by applying the gain setting values obtained just before the start-scanning instruction is input to the image-reading apparatus and the read instruction is received by the image-reading control portion 11 (reception portion). With this, the gain correction process is implemented by the proper gain setting value being applied by a conventional correction process that uses the gain setting value set when the power is switched on.

Furthermore, compared to conventional systems in which a start-scanning instruction is input, and then a gain correction process is implemented after a read instruction is received by the image-reading control portion 11 (reception portion), the image-reading apparatus according to this embodiment of the present invention does not cause user unpleasantness because the actual starting of a scan is not delayed.

As described above, gain settings are repeatedly implemented while the apparatus is in an idling process (an idling state) until the image read instruction is input and the read instruction is received by the image-reading control portion 11 (reception portion).

The gain setting value is recorded in the recording portion 30 (newly set gain setting values) each time the gain setting is repeatedly implemented.

Also, the setting portions (19A and 19B) stop processes that repeatedly set the gain setting value at predetermined time intervals at the point the image read instruction is input and the image-reading control portion 11 (reception portion) receives the read instruction.

The result is that the last recorded gain setting value is used, in the gain correction process in the actual image-reading process. This makes it possible for the setting portions (19A and 19B) to apply the gain setting values (gain conditions) substantially obtained just before the image-reading process in the amplifier 15.

In other words, the image-reading apparatus according to the present invention maximizes the precision of the gain setting value. Furthermore, the image-reading apparatus according to the present invention does not get gain setting values after the image-reading process has started; it uses the gain setting value obtained just before that process. With this, the image-reading apparatus according to the present invention substantially eliminates the problem of delays that occur when actually implementing the image reading process.

The following will now explain FIGS. 1 and 2 in further detail.

FIG. 1 shows changes in output from an imaging element in a conventional image-reading apparatus and timing of a conventional gain correction process operation;

A conventional image-reading apparatus sets (GS) the gain setting value immediately after the power is switched on (time A) and implements the gain correction process (GP) by applying the gain setting value set at time A on the electrical signals output from the color CCD sensor 13 when the scan (image-reading) is started (time B).

Here, there is a large difference G1 between the output value from the color CCD (imaging elements) of the gain setting time (time A) and the output value from the color CCD (imaging elements) at the point that the actual gain setting process (time B) is implemented.

FIG. 2 shows the timing of a gain correction process operation in the image-reading apparatus according to the present invention.

The image-reading apparatus in this embodiment of the present invention intermittently sets (GS) the gain setting value at predetermined time intervals (times A1, A2, A3, A4, and A5) after the power is switched on and implements the gain correction process (GP) by applying the gain setting value set at time A5 on the electrical signals output from the color CCD sensor 13 when the scan (image-reading) is started (time B).

The image-reading apparatus in this embodiment of the present invention applies the gain setting value set just before (time B) the scan is started (time B) in the gain correction process (GP).

There is an extremely small difference G2 compared to the difference G1, described above, between the output value from the color CCD at the point (time A5) that the gain setting value is set, and the output value from the color CCD at the point (time B) the gain correction process is implemented.

For that reason, the image-reading apparatus according to the present invention increases the precision of the gain setting value as described above. Furthermore, the image-reading apparatus according to the present invention does not get the gain setting value after the image-reading process has started; it uses the gain setting value obtained just before that process. With this, the image-reading apparatus according to the present invention substantially eliminates the problem of delays that occur when actually implementing the image reading process.

Time intervals for gain correction settings in an idling process (when in an idling state) are not particularly limited thereto; gain settings can be continuously executed without interruption and can be intermittently executed between periodic moments of inaction.

Furthermore, imaging-element sensitivity widely fluctuates immediately after power is switched on, as shown in FIGS. 1 and 2, but after a certain amount of time has passed, the imaging elements stabilize and substantially do not fluctuate. In other words, as described above, output from the imaging elements is at a maximum when the power is switched on, as shown in FIG. 1, and gradually tapers off thereafter. Therefore, at a point after some time has elapsed after the power has been switched on, there is almost no fluctuation in output from the imaging elements.

This makes it possible to lengthen (it can be set) the time intervals (cycles) according to the length of time that has passed after the power supply portion stitches to an on state, for the time intervals for each gain setting.

For example, as shown in FIG. 2, it is possible to extend time intervals (GS') at which gain setting values are set when there has been a long passage of time (shown at the right side of the drawing) since the power supply portion switched to an on state, to be longer than the time intervals (GS) at which gain setting values are set when there is a short amount of time (shown at the left side of the drawing) after the power supply portion switched to an on state.

In this way, there are longer time intervals at which the setting portions (19A and 19B) repeatedly set the gain setting values (gain conditions) so there is a reduced load on the image-reading control portion 11.

Also, even if the repeat cycle is lengthened according to the time that has passed after the image-reading apparatus power supply portion switched on, the image-reading apparatus can obtain the correct gain setting value. Also, in such a case, the image-reading apparatus does not need to use control means to perform an unnecessary gain setting value acquisition operation.

Also, as described above, in the idling state (while in an idling process), it is preferable to continue lighting the light source L. It is also preferable to continue lighting the light source L and to continue to radiate light on the white balance reference card 106 while in the idling state (while in an idling process). With this embodiment, a gain setting process is repeated performed immediately after the image-reading apparatus enters an idling state. For that reason, there is no meaning in extinguishing the light source L each single time the gain setting process ends. Conversely, such a process actually consumes more power.

The explanation above related to an embodiment of the present invention. However, the image-reading apparatus and the image-forming apparatus according to the present invention are not to be construed to be limited thereto. It is acceptable to apply a variety of variations without departing from the scope of the invention.

The image-reading apparatus explained above can be used in apparatuses such as stand-alone scanners, but it can also be considered as a configuring element of any general image-reading apparatus such as a copier, facsimile or other multi-function system. A copier, facsimile or other of these multi-function systems are typical for the image-forming apparatus described above.

It is needless to say, however, that this includes any image-forming apparatus that utilizes an image-reading apparatus.

What is claimed is:

1. An image-reading apparatus comprising: a power supply portion;
   a reception portion that receives a read instruction;
   a light source for radiating light onto a white balance reference card or an original;
   an imaging element that detects light reflected from the white balance reference card or the original and converts the reflected light thus detected into electrical signals;
   a gain correction processing portion that implements gain correction, based on a predetermined gain condition, on electrical signals output from the imaging element;
   a recording portion that records a gain condition applied by the gain correction processing portion; and
   a gain setting control portion including a setting portion that sets the gain condition based on the electrical signals the imaging element converted by detecting the light reflected from the white balance reference card or the original, wherein the gain setting control portion:
   repeatedly sets the gain condition in the setting portion at predetermined time intervals and records the set gain condition in the recording portion, in an idling state from when the power supply portion switches to an on state until the reception portion receives a read instruction;
   stops setting the gain condition in the setting portion in a reading state after the reception portion receives the read instruction; and
   implements gain correction on the electrical signals output from the imaging element in the gain correction processing portion by applying the gain condition recorded in the recording portion just before the reception portion receives the read instruction.

2. The image-reading apparatus according to claim 1, wherein the gain setting control portion
   lengthens the predetermined time interval when the setting portion repeatedly sets the gain condition according to a length of time elapsed after the power supply portion switches to an on state, in the idling state.

3. The image-reading apparatus according to claim 1, wherein the light source continues to light to radiate light on the white balance reference card, in the idling state.

4. An image-forming apparatus including an image-reading apparatus comprising: a power supply portion;
   a reception portion that receives a reading instruction;
   a light source for radiating light onto a white balance reference card or an original;
   an imaging element that detects light reflected from the white balance reference card or the original and converts the reflected light thus detected into electrical signals;
   a gain correction processing portion that implements gain correction, based on a predetermined gain condition, on electrical signals output from the imaging element;
   a recording portion that records a gain condition applied by the gain correction processing portion; and
   a gain setting control portion including a setting portion that sets the gain condition based on the electrical signals the imaging element converted by detecting the light reflected from the white balance reference card or the original, wherein
   the gain setting control portion: repeatedly sets the gain condition in the setting portion at predetermined time intervals, and records the set gain condition in the recording portion, in an idling state from when the power supply portion switches to an on state until the reception portion receives a read instruction;
   stops setting the gain conditions in the setting portion in a reading state after the reception portion receives the read instruction; and
   implements gain correction on the electrical signals output from the imaging element in the gain correction processing portion by applying the gain conditions recorded in the recording portion just before the reception portion receives the read instruction.

5. The image-forming apparatus according to claim 4, wherein the gain setting control portion
   lengthens the predetermined time interval when the setting portion repeatedly sets the gain condition according to a length of time elapsed after the power supply portion switches to an on state, in the idling state.

6. The image-forming apparatus according to claim 4, wherein the light source continues to light to radiate light on the white balance reference card, in the idling state.

* * * * *